(12) United States Patent
Palin et al.

(10) Patent No.: US 8,493,888 B2
(45) Date of Patent: Jul. 23, 2013

(54) CONNECTIVITY ARCHITECTURE FOR SERVICE DISCOVERY

(75) Inventors: Arto Palin, Viiala (FI); Juha-Matti Tuupola, Tampere (FI); Antti Lappeteläinen, Espoo (FI)

(73) Assignee: Nokia Corporation, Espoo (FI)

( * ) Notice: Subject to any disclaimer, the term of this patent is extended or adjusted under 35 U.S.C. 154(b) by 125 days.

(21) Appl. No.: 12/681,158

(22) PCT Filed: Nov. 8, 2007

(86) PCT No.: PCT/IB2007/054550
§ 371 (c)(1),
(2), (4) Date: May 25, 2010

(87) PCT Pub. No.: WO2009/060263
PCT Pub. Date: May 14, 2009

(65) Prior Publication Data
US 2010/0260067 A1 Oct. 14, 2010

(51) Int. Cl.
*H04L 12/26* (2006.01)
*H04J 3/14* (2006.01)
*G08C 15/00* (2006.01)
*G06F 11/00* (2006.01)
*G01R 31/08* (2006.01)

(52) U.S. Cl.
USPC ............ 370/254; 370/236; 709/205; 709/213

(58) Field of Classification Search
USPC ................. 370/230–254, 328–397, 428–431; 709/204–209, 224–229, 213; 711/100–147, 711/201–203
See application file for complete search history.

(56) References Cited

U.S. PATENT DOCUMENTS

| | | | |
|---|---|---|---|
| 5,822,598 A | 10/1998 | Lam | |
| 5,987,506 A * | 11/1999 | Carter et al. | 709/213 |
| 6,026,474 A * | 2/2000 | Carter et al. | 711/202 |
| 6,148,377 A * | 11/2000 | Carter et al. | 711/147 |

(Continued)

FOREIGN PATENT DOCUMENTS

| | | |
|---|---|---|
| EP | 1347623 | 9/2003 |
| EP | 1542409 | 6/2005 |

(Continued)

OTHER PUBLICATIONS

Pavlin Dobrev, et al; "Device and Service Discovery in Home Networks OSGi"; IEEE Communications Magazine, Aug. 2002, pp. 86-92.

(Continued)

*Primary Examiner* — Man Phan
(74) *Attorney, Agent, or Firm* — Locke Lord LLP

(57) ABSTRACT

A system including a billboard that may comprise a common memory space allocated amongst at least two devices. Service nodes created on the billboard may represent services offered by the at least two devices. Service nodes may interact with each other on the billboard in order to perform inquiries for required services. For example, an application residing in the at least two devices may access the billboard in order to locate service nodes pertaining to a desired service. Information available from service nodes may include service property and usable transport information. A direction connection may then be made between the application and the service after a service node is selected.

10 Claims, 14 Drawing Sheets

U.S. PATENT DOCUMENTS

| | | | |
|---|---|---|---|
| 6,424,621 B1* | 7/2002 | Ramaswamy et al. | 370/230 |
| 6,601,093 B1 | 7/2003 | Peters | |
| 6,604,140 B1 | 8/2003 | Beck et al. | |
| 6,879,561 B1 | 4/2005 | Zhang et al. | |
| 6,909,721 B2 | 6/2005 | Ekberg et al. | |
| 7,352,998 B2 | 4/2008 | Palin et al. | |
| 7,590,097 B2 | 9/2009 | Ekberg et al. | |
| 7,610,287 B1* | 10/2009 | Dean et al. | 1/1 |
| 7,668,565 B2 | 2/2010 | Ylanen et al. | |
| 7,697,893 B2 | 4/2010 | Kossi et al. | |
| 7,796,520 B2* | 9/2010 | Poustchi et al. | 370/236 |
| 7,945,675 B2* | 5/2011 | Skomra | 709/227 |
| 8,051,157 B2* | 11/2011 | Park et al. | 709/223 |
| 2003/0100308 A1 | 5/2003 | Rusch | |
| 2003/0236890 A1* | 12/2003 | Hurwitz et al. | 709/227 |
| 2004/0019640 A1* | 1/2004 | Bartram et al. | 709/205 |
| 2005/0003822 A1 | 1/2005 | Aholainen et al. | |
| 2005/0013259 A1 | 1/2005 | Papoushado et al. | |
| 2005/0066033 A1 | 3/2005 | Cheston et al. | |
| 2005/0071879 A1 | 3/2005 | Haldavnekar et al. | |
| 2005/0097087 A1* | 5/2005 | Punaganti Venkata et al. | 707/3 |
| 2005/0114448 A1 | 5/2005 | Skomra | |
| 2005/0138173 A1 | 6/2005 | Ha et al. | |
| 2005/0193103 A1 | 9/2005 | Drabik | |
| 2005/0254472 A1 | 11/2005 | Roh et al. | |
| 2006/0140146 A1 | 6/2006 | Funk et al. | |
| 2006/0168644 A1 | 7/2006 | Richter et al. | |
| 2006/0259606 A1 | 11/2006 | Rogers et al. | |
| 2007/0058630 A1 | 3/2007 | Fujimoto | |
| 2007/0141984 A1 | 6/2007 | Kuehnel et al. | |
| 2007/0180073 A1 | 8/2007 | Paul et al. | |

FOREIGN PATENT DOCUMENTS

| | | | |
|---|---|---|---|
| EP | 1758312 A1 | 2/2007 | |
| EP | 1858210 A1 | 11/2007 | |
| EP | 1 954 086 | 8/2008 | |
| JP | 2001307042 | 2/2001 | |
| JP | 2002312726 | 10/2002 | |
| WO | WO 2007058241 | 5/2001 | |
| WO | 2004008793 A | 1/2004 | |
| WO | 200795966 A1 | 8/2007 | |

OTHER PUBLICATIONS

Miaoqing, et al, "Service Discovery between Multiple Home Networks"; TKK T-110.5190 Seminar on Internetworking—2007.

International Search Report and Written Opinion for corresponding Patent Cooperation Treaty Application No. PCT/IB2008/050711, dated Feb. 2, 2009, 14 pages.

Steenkiste, "A Systematic Approach to Host Interface Design for High Speed Networks," Computer, IEEE Service center, Los Alamitos, CA, US, vol. 27, No. 3, Mar. 1994, pp. 47-57.

Kliazovich et al., "A Delayed-ACK Scheme for MAC-Level Performance Enhancement of Wireless LANs", Telecommunications and Networking—ICT 2004; [Lecture Notes in Computer Science; LNCS], Springer-Verlag, Berlin/ Heidelberg, vol. 3124, Jul. 2004, pp. 1289-1295.

International Search Report and Written Opinion of the International Searching Authority for PCT/IB2008/050709, dated Feb. 25, 2009, 18 pages.

Eriksson et al., "Providing Quality of Service in Always Best Connected Networks", IEEE Communications Magazine, IEEE Service Center, Piscataway, US, vol. 41, No. 7, Jul. 2003, pp. 154-163.

Suoranta et al., "New Directions in Mobile Device Architectures", Digital System Design: Architectures, Methods and Tools, 2006. DSD 2006, 9th Euromicro Conference on IEEE PI, Jan. 2006, pp. 17-26.

International Search Report and Written Opinion of the International Searching Authority for corresponding Patent Cooperation Treaty Application No. PCT/IB2008/050708 dated Mar. 3, 2009, 17 pages.

Lee et al., "Protocols for Service Discovery in Dynamic and Mobile Networks", International Journal of Computer Research, vol. 11, No. 1, 2002, pp. 1-12.

The Salutation Corsortium, "Salutation Architecture Specification (Part 1), Version 2.1" Salutation Architecture Specification, XX, XX, Dec. 31, 1999, i-v, 1.

Lapetelainen et al., "Networked Systems, Services and Information", NOTA2008, 1st International network on Terminal Architecture Conference, Jun. 11, 2008, pp. 1-7.

Keonlof et al., "Advances in Design and Specification languages for Embedded Systems", Jul. 19, 2007, Springer, Netherlands.

Desoli et al., "An Outlook on the Evolution of Mobile Terminals: From monolithic to modular multiradio, multiapplication platforms", IEEE Circuits and Systems Magazine, IEEE Service Center, New York, vol. 6, No. 2, Jan. 1, 2006, pp. 17-29.

Se Gi Hong, et al: "Accelerating Service Discovery in Ad-Hoc Zero Configuration Networking" Global Telecommunications Conference, 2007, Globecom '07, IEEE, IEEE Piscataway, NJ, USA, Nov. 1, 2007, pp. 962-965, XP031196113 ISBN: 978-1-4244-1042-2, section II.

Celeste Campo, et al: "DNS-Based Service Discovery in Ad Hoc Networks: Evaluation and Improvements" Personal Wireless Commications Lecture Notes in Computer Science; LNCS, Springr Berlin, DE, vol. 4217, Jan. 1, 2006, pp. 111-122, XP019044018 ISBN: 978-3-540-45174-7, section 2.

Stuart Cheshire; marc Krochmal, Apple Computer, et al: "DNA-Based Service Discovery; draft-cheshire-dnsext-dnssd-04.text" IETF Standard-Working-Draft, Internet Engineering Task Force, IETF, CH, No. 4, Aug. 10, 2006, XP015046478 ISSN: 0000-0004, section 14.

International Search Report and Written Opinion for PCT/IB2008/053759 dated Mar. 27, 2009, 15 pages.

Quiroz, et al., "Version vectors based synchronization engine for mobile devices", Proceeding PDCN'07 Proceedings of the 25th conference on Proceedings of the 25th IASTED International Multi-Conference: parallel and distributed computing and networks 2007.

Final Technology Evaluation Report SIRENA Service Infrastructure for Real-time Embedded Networked Applications ITEA 02014 Project Reference WP2/110 Version V1.0 Author(s) / Organisation SIRENA Consortium Date May 14, 2004.

Lent, R.; "Smart packet-based selection of reliable paths in ad hoc networks" Design of Reliable Communication Networks, 2005. (DRCN 2005). Proceedings.5th International Workshop on Oct. 16-19, 2005 p. 5 pp.

International Search Report and Written Opinion for PCT/FI2008/050242, dated Aug. 18, 2008, 12 pages.

Raverdy et al., "Efficient Context-aware Service Discovery in Multi-Progtocol Pervasive Environments", Mobile Data Management, 7th International Conference, Conference Proceedings Article, IEEE, May 10, 2006.

Raverdy et al., "A Multi-Protocol Approach to Service Discovery and Acces in Pervasive Environments", Mobile and Ubiquitous Systems: Networking & Services, 2006 Third Annual International Conference on Jul. 2006, IEEE 2006, pp. 1-9.

Kim et al., "Service Discovery Using FIPA-Compliant AP to Support Scalability in Ubiquitous Environments", Proceedings of the Fourth Annual ACIS International Conference on Computer and Information Science on 2005, pp. 647-652.

Scholten et al., "Secure Service Discovery in Home Networks", International Conference on Consumer Electronics, 2006, ICCE '06, 2006 Digest of Technical Papers, Jan. 7-11, 2006, pp. 115-116.

International Search Report and Written Opinion for PCT/IB2008/052437, dated May 1, 2009, 14 pages.

Office Action from European Patent Application No. 08776431.2, dated Aug. 2, 2010, 6 pages.

Rekimoto et al., "A Multiple Device Approach for Supporting Whiteboard-Based Interactions", Chi '98. Human Factors in Computing Systems, Conference Proceedings, Los Angeles, CA, Apr. 18-23, 1998.

Frank et al, "A Customizable Shared Information Space to Support Concurrent Design", Computers in Industry, Elsevier Science Publishers, Amsterdam, NL, vol. 48, No. 1, May 1, 2002, pp. 45-57.

Tandler, "Software Infrastructure for Ubiquitous Computing Environments: Supporting Synchronous Collaboration with Heterogeneous Devices", Lecture Notes in Computer Science, LNCS, vol. 2201/Jan. 1, 2001, pp. 95-115.

Translation of Japanese Patent Office Action dated Jun. 11, 2012 for Japanese Application No. 2010-523545.

* cited by examiner

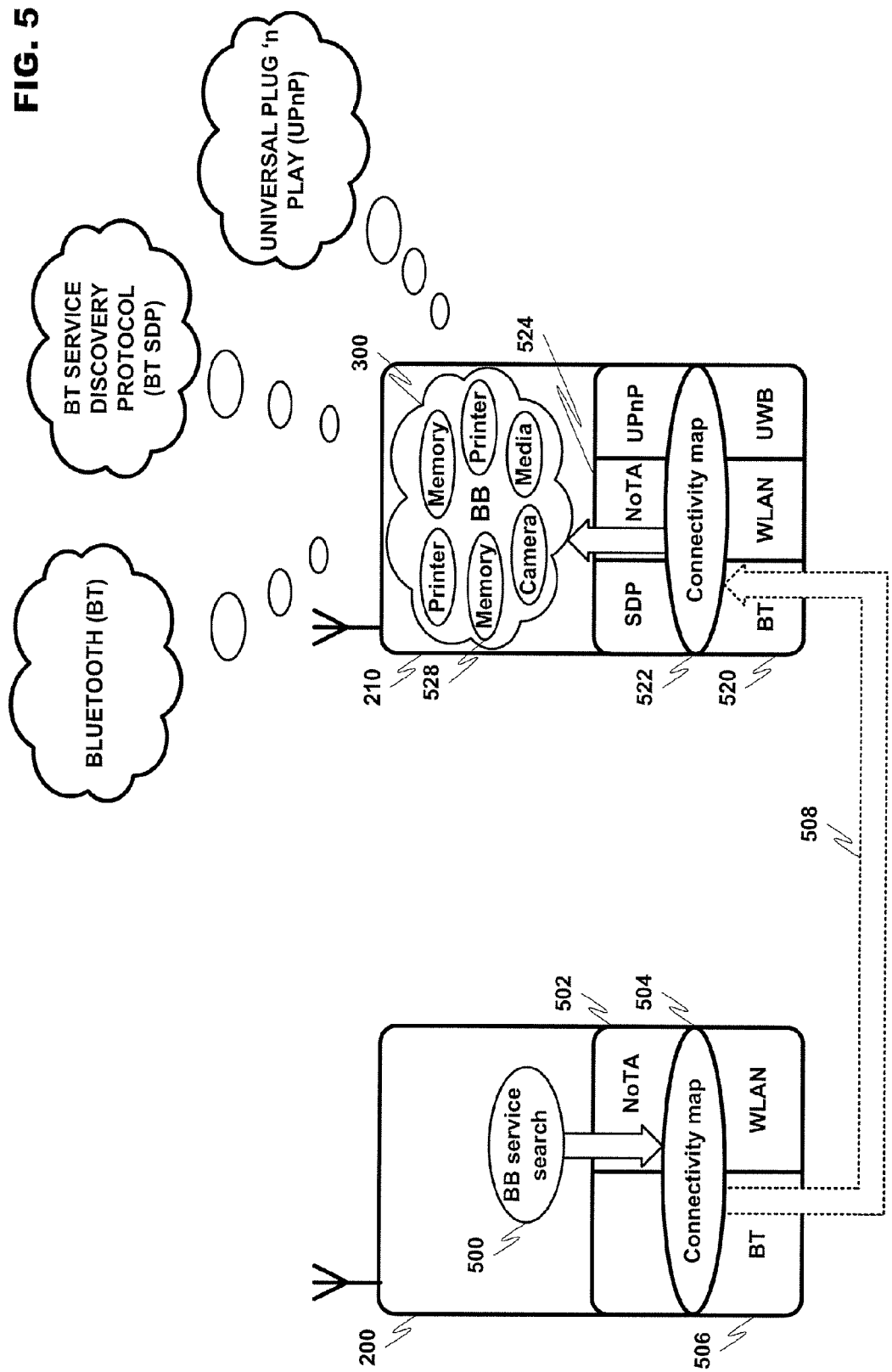

CONNECTIVITY ARCHITECTURE FOR SERVICE DISCOVERY

BACKGROUND OF INVENTION

1. Field of Invention

The present invention relates to strategies for wirelessly conveying information between devices, and more specifically, to a system for making services that may exist on one or more devices available to any device via a shared information space.

2. Background

In general, a software program may include a set of instructions, executable by a processor, that are organized to receive input (e.g., data) for a calculation or determination that may then result in an output. Over the years, software technology has evolved to transform these individual instruction sets into modules that may in turn be integrated together to form the more complex programs we know today. Today's more-sophisticated software programs may receive various forms of input such as raw data, for example as stored in magnetic or optical storage, user input through various known types of user interfaces, measured or monitored information converted to electronic information from electronic and/or electromechanical sensors, etc.

In some instances, programs may be configured to produce data usable by other software applications. However, a problem may be presented in conveying the information from one program to another. If the relationship is known before the programs are created, then a specific strategy may be devised to convert one program's output into another program's input. Traditionally this strategy has led to functional but rigid software applications, requiring frequent and possibly substantial revisions due to changes in functionality, platform, architecture, etc.

An example of this rigid incompatibility may be seen in solutions currently utilized for coupling wireless communication devices. Some manufacturers may attempt to simplify device operation by facilitating automatic wireless recognition and connection functionality between devices. This automated behavior, similar to the original "plug and play" devices that became available with the emergence of Universal Serial Bus (USB) technology, may allow unskilled users to operate wirelessly-coupled devices without having to first configure device communication settings. However, this functionality is often achieved through the use of services established by different manufacturers or user groups such as Bluetooth™ Service Discovery Protocol (BT SDP), Bonjour, Universal Plug and Play (UPnP), etc. Individually these protocols (e.g., groups of services) may function adequately, but they were not created with the ability to interact. In at least one problematic scenario, a wireless communication device utilizing one service discovery protocol would not be able to wirelessly connect to another device, identify another device, utilize services on another device, etc. that is utilizing a different service discovery protocol, and therefore, beneficial functionality available on a device may be lost because a wireless coupling between devices cannot be automatically established.

SUMMARY OF INVENTION

The present invention includes at least a method, computer program, device and system for managing the operation of one or more devices interacting with a shared memory area, or billboard. Nodes also resident on the one or more devices may interact with the billboard in order to transmit/receive data. For example, nodes may be associated with various services offered by the one or more devices, providing a means for interaction by which incompatibilities between different services may be overcome.

In at least one embodiment of the present invention, the billboard may be comprised of a shared memory space allocated amongst a plurality of devices. In this configuration, each device may contain within its memory a "section" of the billboard. After the one or more devices are wirelessly coupled, information related to services available on the devices may be obtained, and this information may in turn be utilized to create one or more service nodes corresponding to the offered services. Service nodes resident in the billboard may then be queried by applications also resident on the one or more devices that require the use of a particular service. Locating a service node related to the desired service may then facilitate a direct link between the application and service.

The present invention may, in at least one embodiment, initiate wireless communication with another device over a commonly supported wireless communication medium. This wireless link may support various protocols that enable the formation of the shared memory space, service nodes, etc. on the devices. Network on Terminal Architecture (NoTA) is an example of an architecture that may be implemented in various embodiments of the present invention and that may be utilized to link billboard sections in each device. In creating service nodes, information related to properties and transport mediums usable by each service may be obtained. Property information may be made available to applications by accessing the service node. Transport medium information (e.g., typically OSI layer 1-4) may relate each service to one or more corresponding wired or wireless communication mediums, and may further be employed in formulating a connectivity map. The connectivity map ties each service to its corresponding transport mediums, and may be utilized by an application when deciding which service to select.

DESCRIPTION OF DRAWINGS

The invention will be further understood from the following description of various exemplary embodiments, taken in conjunction with appended drawings, in which:

FIG. 5 discloses an example of communication to a billboard utilizing a connection map in accordance with at least one embodiment of the present invention.

DESCRIPTION OF EXEMPLARY EMBODIMENTS

While the invention has been described below in terms of a multitude of exemplary embodiments, various changes can be made therein without departing from the spirit and scope of the invention, as described in the appended claims.

I. System Architecture

Figure 1:
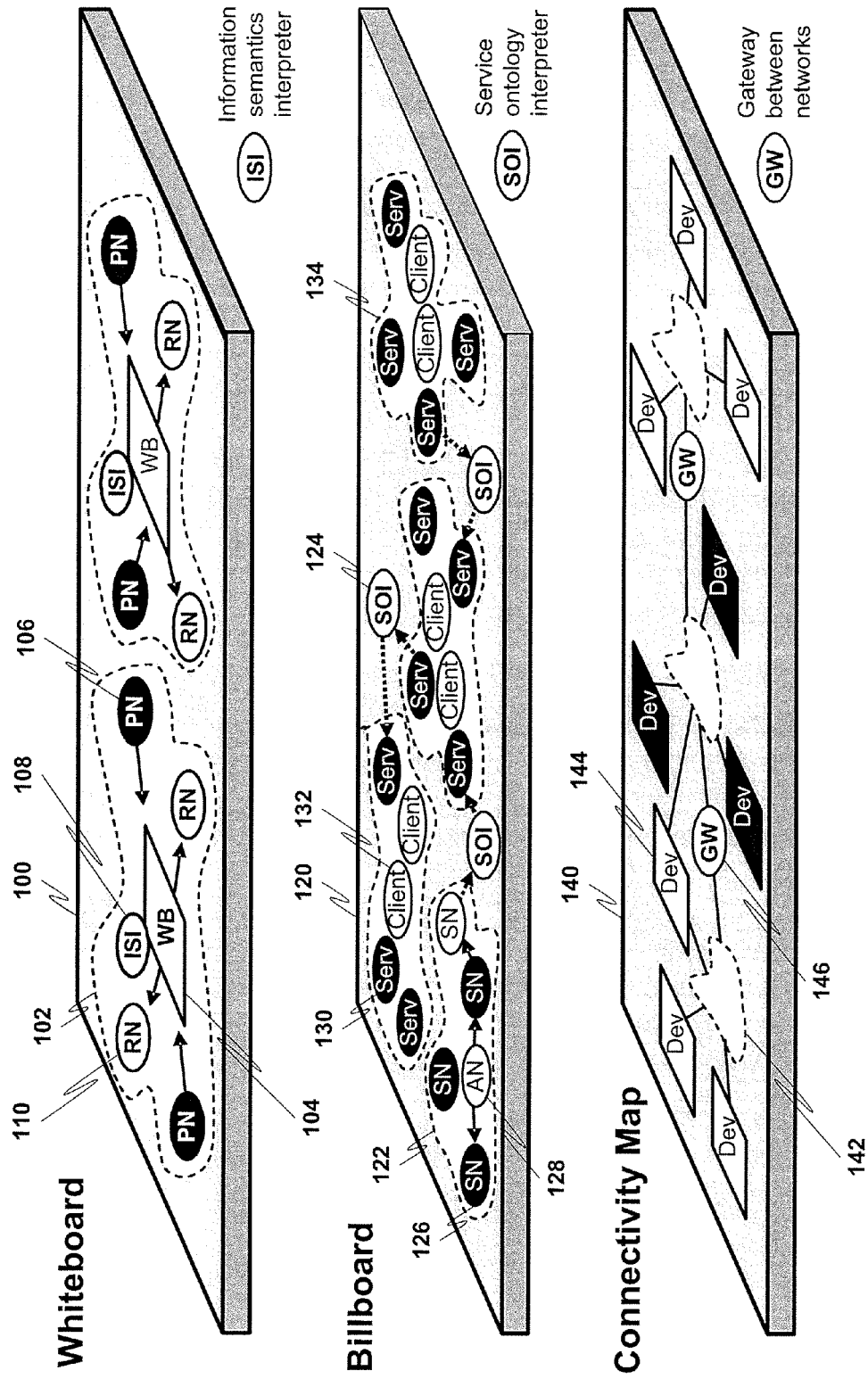
FIG. 1 discloses the exemplary levels of a wireless communication architecture in accordance with at least one embodiment of the present invention.

An exemplary wireless communication architecture in accordance with at least one embodiment of the present invention is disclosed in FIG. 1. While the present invention focuses mainly on Billboard 120 and Connectivity Map 140, Whiteboard 100 is also disclosed for contextual purposes. Whiteboard 100 may comprise the highest level of operation in this architecture. At this level, operational groups 102 may be formed including whiteboards 104 and various application nodes. Application nodes may correspond to application existing on a plurality of wireless communication devices, and may be utilized to exchange information between these applications, for example, by placing data into, and removing data from, whiteboard 104. For example, the various nodes may consist of proactive nodes (PN) 106 that may be utilized to place information into whiteboard 104, reactive nodes (RN) 110 may be utilized to take information from whiteboard 104. Information semantics interpreter (ISI) 108 may be utilized to link different whiteboards together. Utilizing these constructs, Whiteboard 104 may provide a standardized means for application interaction that overcomes many incompatibilities.

Billboard level 120 may facilitates interaction between services available on the one or more devices. Services 130 and clients 132 that may utilize these services may be organized in service domains 122. In at least one scenario, service domains 122 may correspond to a particular protocol, such as UPnP, BT SDP, Bonjour, etc. In each service domain 122, services 130 may be represented by service nodes (SN) 126, and likewise, application nodes (AN) 128 may be established to correspond to applications. Further, service domains 122 may interact utilizing service ontology interpreters (SOI) 124. SOI 124 may allow service domains 122 to interact with other service domains 122 in the service level, even if the service domains 122 reside on different wirelessly-linked devices (e.g., to provide access information to other service domains 122).

Connectivity map 140 may define available connectivity methods/possibilities and topology for different devices participating in sharing resources in order to support whiteboard 100 and billboard 120. In at least one embodiment of the present invention, devices 144 may be linked in directly connected groups 142. Examples of directly connected groups of devices (Dev) 142 may include devices connected via Bluetooth™ piconet, a WLAN network, a wUSB link, etc. Each directly connected group of devices 142 may further be linked by gateways (GW).

Figure 2:
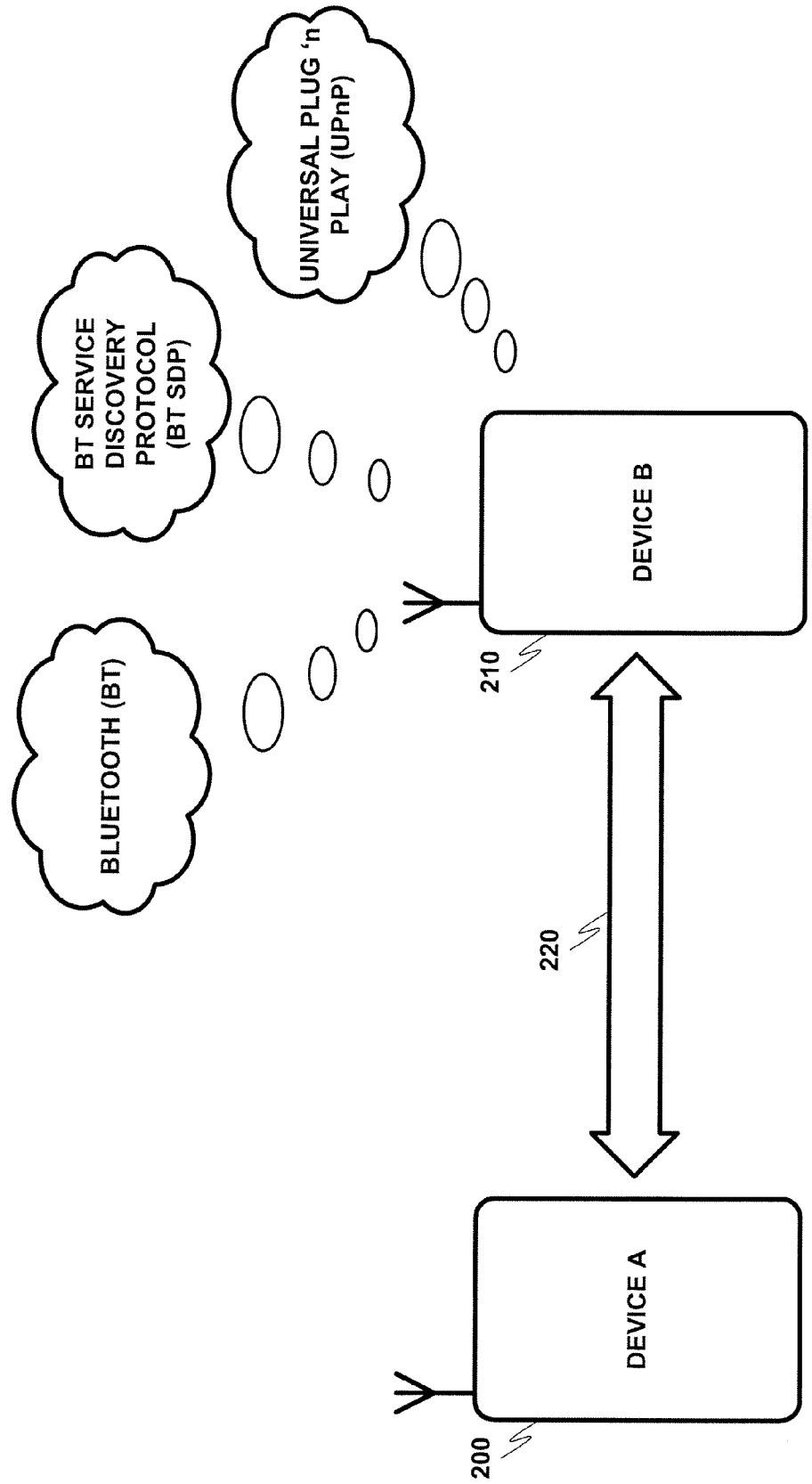
FIG. 2 discloses an exemplary link between two wireless communication devices in accordance with at least one embodiment of the present invention.

While FIG. 1 discloses an overall communication architecture usable with various embodiments of the present invention, for the sake of explanation in the present disclosure, a much more rudimentary scenario will be utilized to illustrate service node related functionality. FIG. 2 discloses device A 200 and device B 210. Examples of devices usable in instance may include various wireless communication devices ranging from very basic wireless devices like wirelessly-enabled sensors or cellular handsets to more complex wirelessly-enabled computing devices like laptop or palmtop computers, wireless communicators, personal digital assistants, or any similar devices with wired connectivity interfaces. The devices disclosed in FIG. 2 may be linked via wireless communication 220 (e.g., WLAN), for example, in order to form an ad-hoc network between the devices. Device B 210 may further include a variety of services and service search mechanism such as Bluetooth™-related BT SDP and UPnP. Under existing architecture schemes, device A 200 would not be aware of these services over wireless link 220, and further, even if device A 200 was aware, most or all of these services would probably be inaccessible due to various incompatibility issues existing between services. As a result, wireless coupling 220 between Device A 200 and Device B 210 may only be beneficial for conveying information, since no access to remote services is available.

II. Service Node Implementation

A service may be defined as the functionality offered or derived from a particular software program. Services may pertain to all aspects of device functionality. Services may be provided, for example, by an operating system loaded on a wireless communication device, or may be added to the device by accessory applications related to communication, security, productivity, device resource management, entertainment, etc. In accordance with at least one embodiment of the present invention, one or more service nodes may be established to correspond to services available on the one or more devices.

Figure 3:
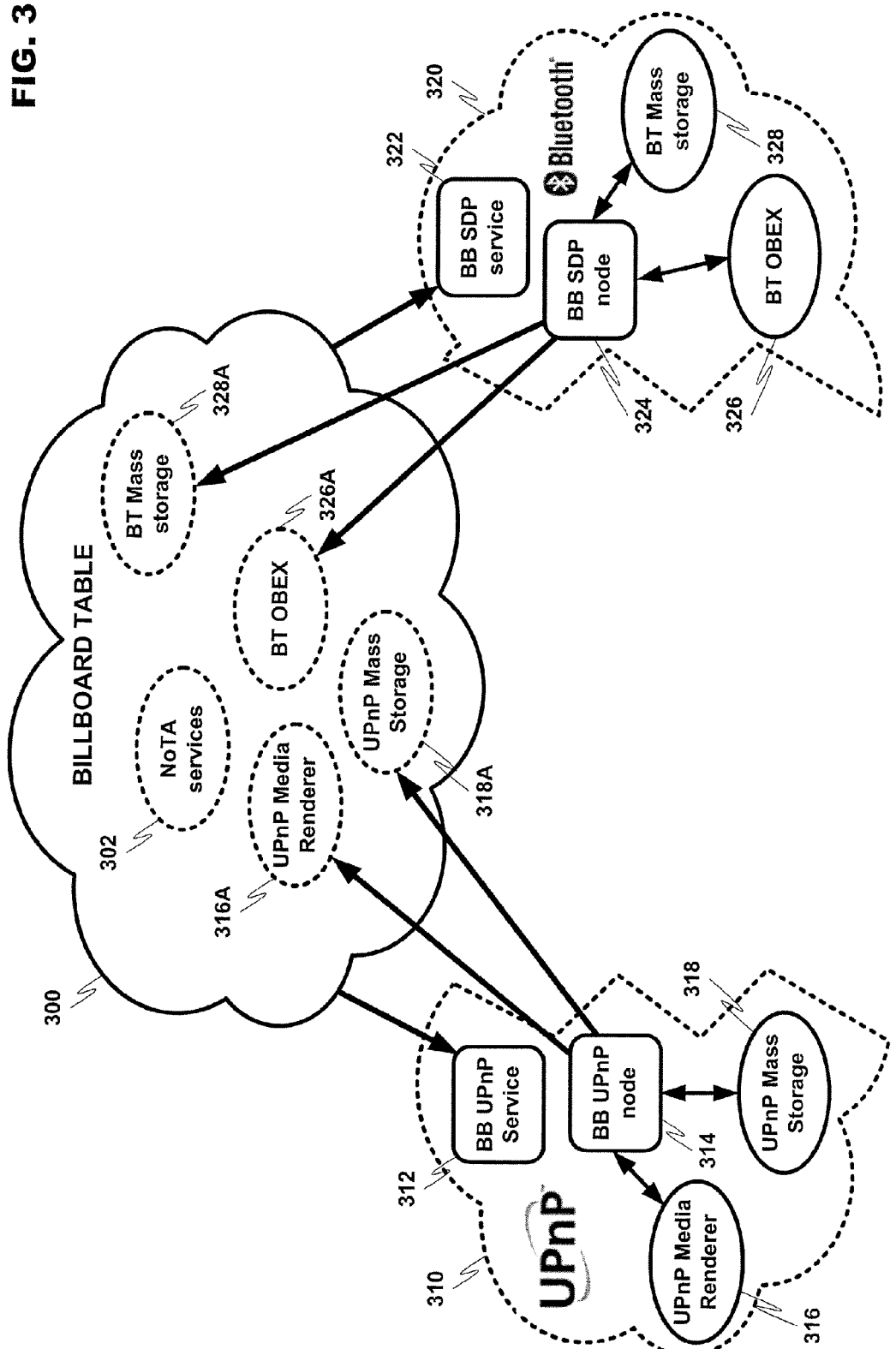
FIG. 3 discloses an example of services being utilized to create service nodes on a billboard in accordance with at least one embodiment of the present invention.

FIG. 3 discloses an example of billboard functionality in accordance with at least one embodiment of the present invention. Billboard 300 may comprise a shared memory space established amongst one or more wired or wireless devices. The scenario disclosed in FIG. 3 may further include a protocol such as UPnP 310 installed on a device (e.g., device A 200), and Bluetooth™ SDP 320 installed, for example, on device B 210. Billboard 300 may interact with these protocols using one or more services installed on devices A 200 and B 210, such as exemplary billboard services BB UPnP service 312 and BB SDP service 322. BB services 312 and 322 may typically be components of UPnP and BT architecture but they may be components of an NoTA architecture, an exemplary configuration of which is described in detail below with respect to FIG. 4.

UPnP 310 may offer various services locally on device A 200. These services may include UPnP media renderer service 316 and UPnP mass storage service 318. Similarly, Bluetooth™ SDP 320 may provide BT OBEX service 326 and BT mass storage service 328 on device B 210. It is important to note that these specific services have been used only for the sake of example in the present disclosure, and are not intended to limit the scope of services usable with various embodiments of the present invention. While these exemplary services would normally only be accessible to applications residing on the same service domain, the present invention, in accordance with at least one embodiment, may provide for the interaction of various services and/or applications, regardless of the domain on which a service resides.

At least one embodiment of the present invention may operate to create service nodes corresponding to the services offered on each device in billboard table 300. In the scenario disclosed in FIG. 3, BB UPnP node 312 and BB SDP node 322 may create service nodes UPnP media renderer service 316A and UPnP mass storage service 318A, as well as BT OBEX service 326A and BT mass storage service 328A, respectively. These nodes exist in a common billboard table 300, despite the protocols and services actually residing on separate devices. Further, the nodes may provide information about services to other services and/or applications, such as the name of the service, service properties, pairing & authentication information utilized in accessing a particular service and/or transport mediums usable with each service. This service information may be obtained, for example by utilizing BB SDP service 322 if billboard table 300 wants to be used from the BT domain, or BB UPnP 312 service if billboard table 300 is wants to be utilized from the UPnP domain. It may also be possible that some architectures, such as NoTA, support billboard service directly. NoTA services 302 may be utilized, in accordance with at least one embodiment of the present invention, to establish the initial communication between devices A 200 and B 210 via a wireless communication medium in order to establish a shared memory space that will be utilized as Billboard table 300.

III. Underlying Architecture

Figure 4A:
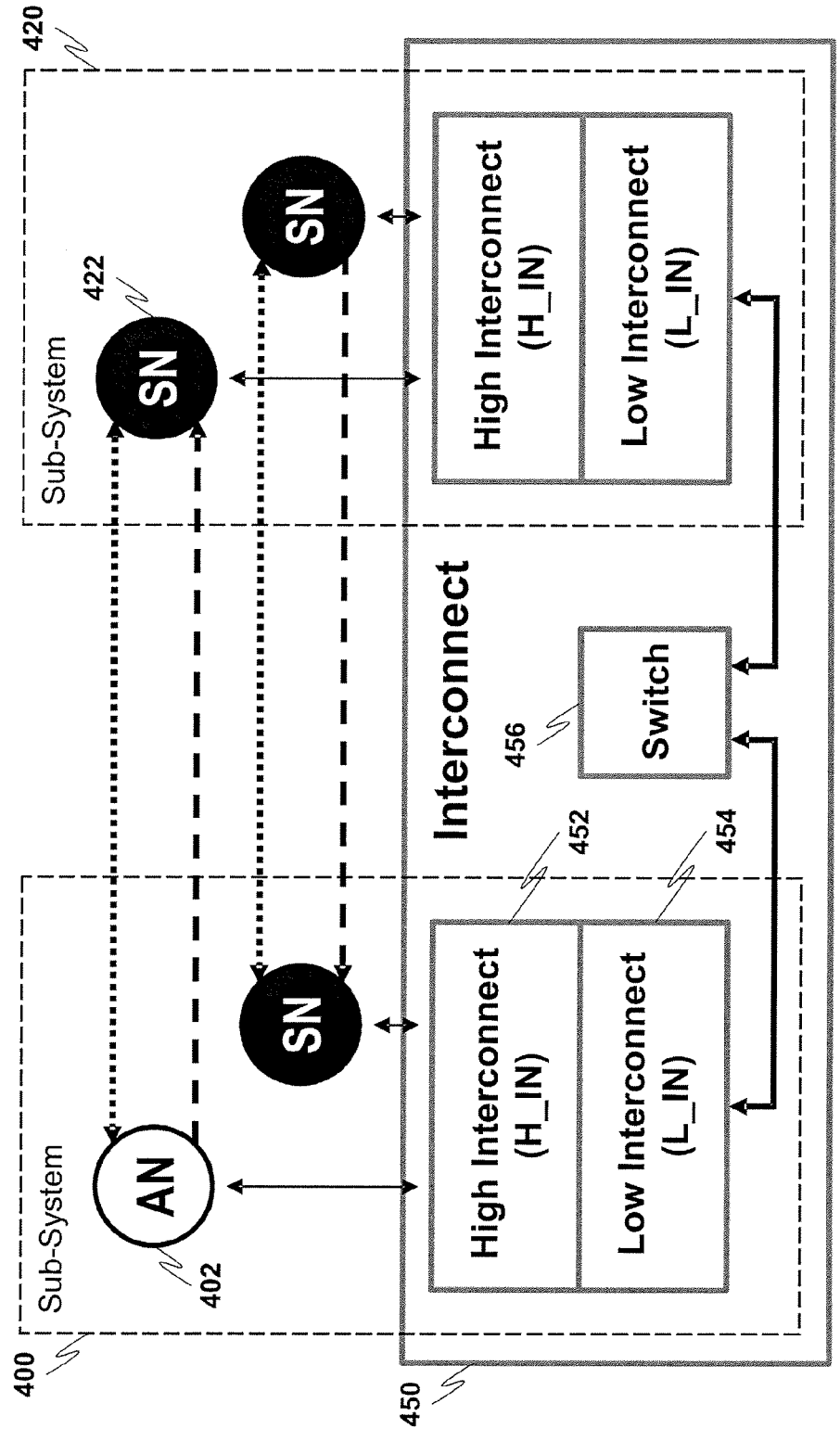
FIG. 4A discloses an exemplary Network on Terminal Architecture in accordance with at least one embodiment of the present invention.

FIG. 4A discloses an example of an underlying logical architecture that may be utilized in implementing NoTA. NoTA may be configured as multiple subsystems (e.g., 400 and 420) coupled by interconnect 450. NoTA interconnect 450 may comprise two layers: High Interconnect (H_IN) layer 452 and Low Interconnect (L_IN) layer 454 coupled by switch 456. Low interconnect layer 454 may include ISO/OSI layers L1-L4 and may provide transport socket type interface upwards. High Interconnect layer 452 may act as the middleware between L_IN 454 and the higher level Application nodes (AN) 402 and Service nodes (SN) 422 residing in subsystems like 400 and 420. Key H_IN 452 functionality is to provide client nodes (AN 402 or SN 422) on top a direct access to services (without having to disclose the location of the latter). All communication may be connection-oriented, meaning that before any service or data communication takes place, connection setup procedures need to be carried out. Security features have been added to countermeasure the identified threats. NoTA is an architecture that may be used to provide intra-device service access, making it possible to build independent subsystems providing both services and applications. In an exemplary implementation there may be several individual NoTA devices involved in direct inter subsystem communication.

Figure 4B:
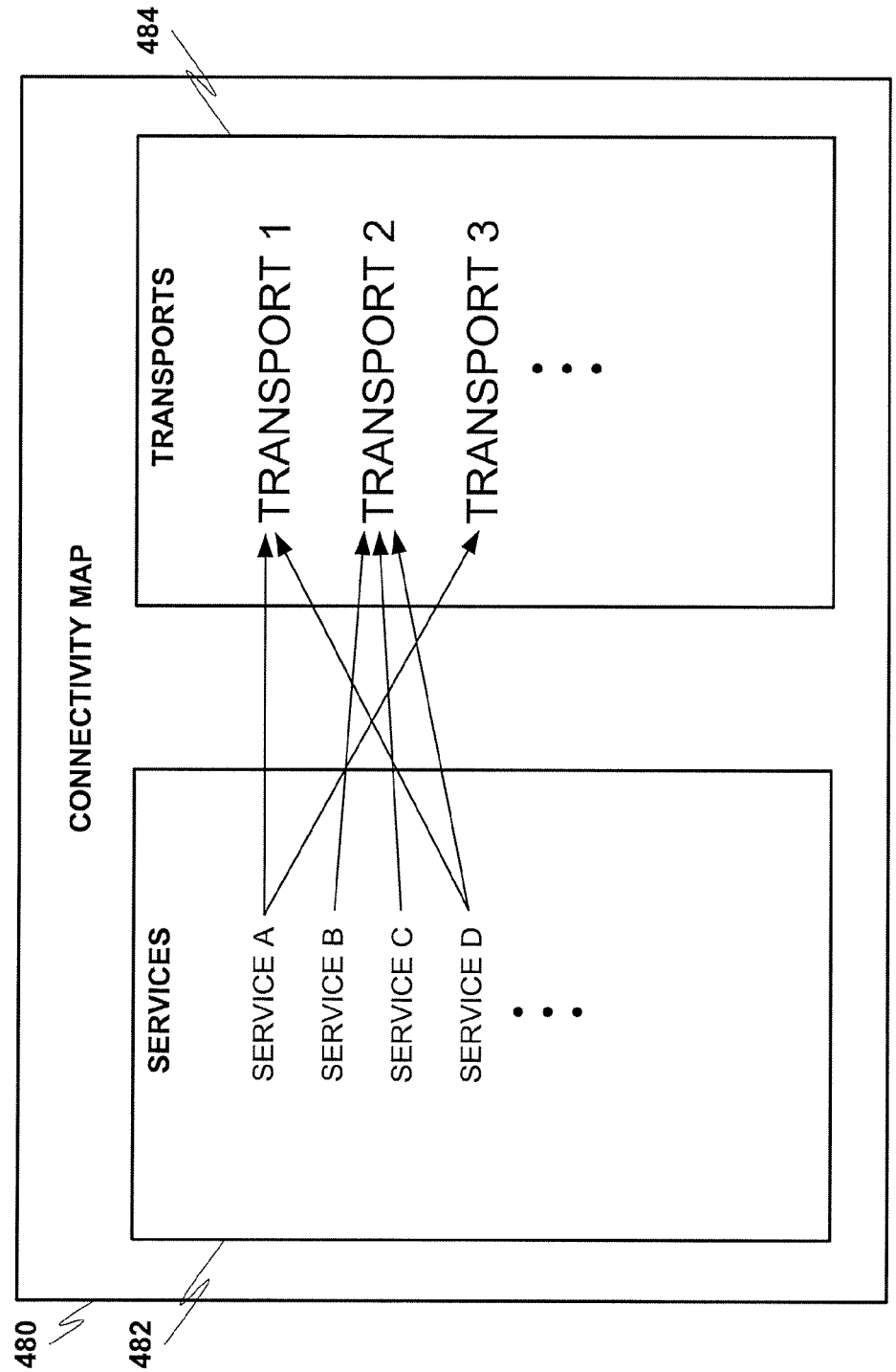
FIG. 4B discloses an exemplary transport table in accordance with at least one embodiment of the present invention.

FIG. 4B discloses another underlying construct that may be implemented in various embodiments of the present invention. Connectivity map 480 may be utilized to map the various services offered on the one or more devices participating in billboard table 300 to various transport mediums that may be utilized with each service. In the present example, transport mediums may comprise wireless communication mediums such as Bluetooth™, WLAN, Wibree™, wUSB, etc. In addition, the present invention, in accordance with at least one embodiment, may also be that radio technologies can be used with several protocols (e.g., Bluetooth protocols may be implemented over WLAN). However, the present invention is not specifically limited to using these particular wireless communication mediums, and may be implemented with other wireless communication mediums that are usable by services offered by various devices. In this example, Services offered by the devices may be listed under services 482, and the corresponding available transport mediums are listed under transports 484. Arrows between services 482 and transport mediums 484 indicate the one or more transport mediums usable by each service. Connectivity map 480 may be utilized by applications in determining an appropriate transport medium to utilize with a particular service. Where two or more transport mediums are available, a particular transport medium may be selected based on various characteristics such as speed, traffic, priority of executing the service, other active wireless communication mediums, etc.

Now referring to FIG. 5, an example depicting a wireless transaction between device A 200 and device B 210 is disclosed in accordance with at least one embodiment of the present invention. In this instance, BB service search 500 on device A 200 may require the use of a particular service. Further, billboard table 300 may reside on device B 210. Regardless of the actual location of the service required by BB service search 500, a query may be made of billboard table 300 to gain access to a corresponding service node. This is because all available service information on the one or more devices participating in billboard table 300 is centrally located, reducing the steps required to access each service, and therefore, increasing the speed of access for available services. In addition, various embodiments of the present invention may include more than one billboard table 300 established between the linked devices. These billboard tables 300 may interact with each other to create a shared information pool that services may access.

BB service search 500 may, for example, using NoTA service 502 residing on device A 200 in order to access billboard table 300. In this example, connectivity map 504 may map to at least Bluetooth™ 506 as a transport medium usable by NoTA service 502. Other wireless communication mediums may also be usable as transport mediums, however in this example Bluetooth™ 506 is selected (e.g., by a user, by BB service search 500, by an application calling BB service search 500, etc.) A Bluetooth™ wireless link 508 may then be utilized to communicate between device A 200 and device B 210.

The wireless inquiry sent by device A 200 may then be received by device B 210. Bluetooth™ resources 520 in device B may correspond to (e.g., may be usable by) NoTA service 524 as determined by a mapping in connectivity map 522. NoTA service 524 may provide access to search billboard table 528, which may contain various service nodes 528 corresponding to various services available in the linked wireless communication devices. Again, while two devices are shown in the example of FIG. 5, more than two devices may participate in billboard table 300, including service nodes 528 corresponding to services that are offered by each device. BB service search 500 may then perform an inquiry of the service nodes 528 available in billboard table 300 in order to determine if any service will be suitable for the parameters specified in the search. An exemplary inquiry of billboard table 300 is now described with respect to FIG. 6A-6E.

IV. Exemplary Application/Service Node Interaction

Figure 6A:
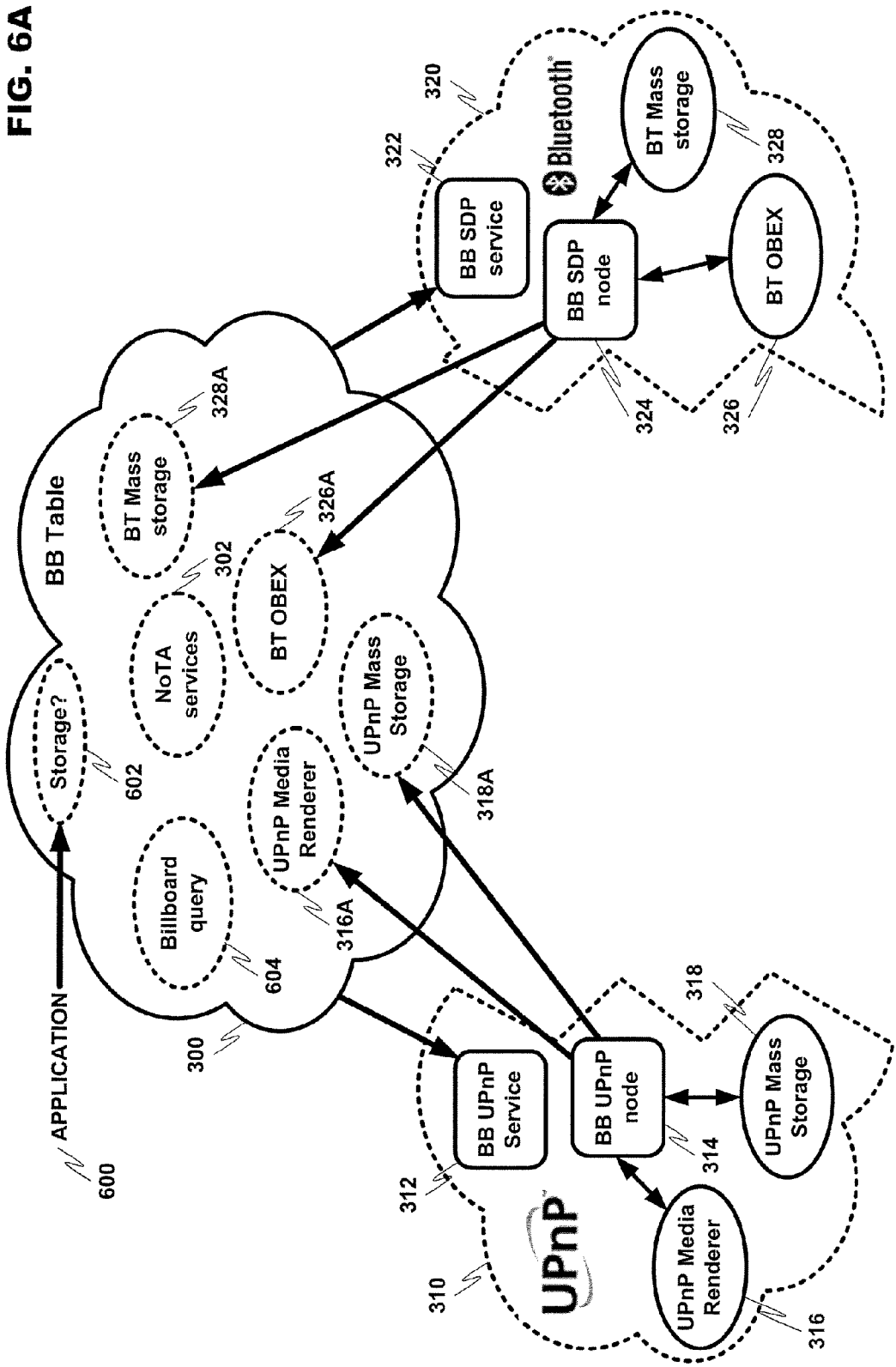
FIG. 6A-6E discloses an example of an application querying and selecting a service in accordance with at least one embodiment of the present invention.

FIG. 6A-6E disclose an exemplary usage scenario in accordance with at least one embodiment of the present invention. In FIG. 6A, an exemplary situation is shown wherein application 600 running on one of the devices participating in billboard table 300 may have a requirement for storage as indicated at 602. As a result, access to a service providing storage activities may be desired in order to support application 600. This inquiry may be performed, at least in part, by a billboard query 604.

Figure 6B:
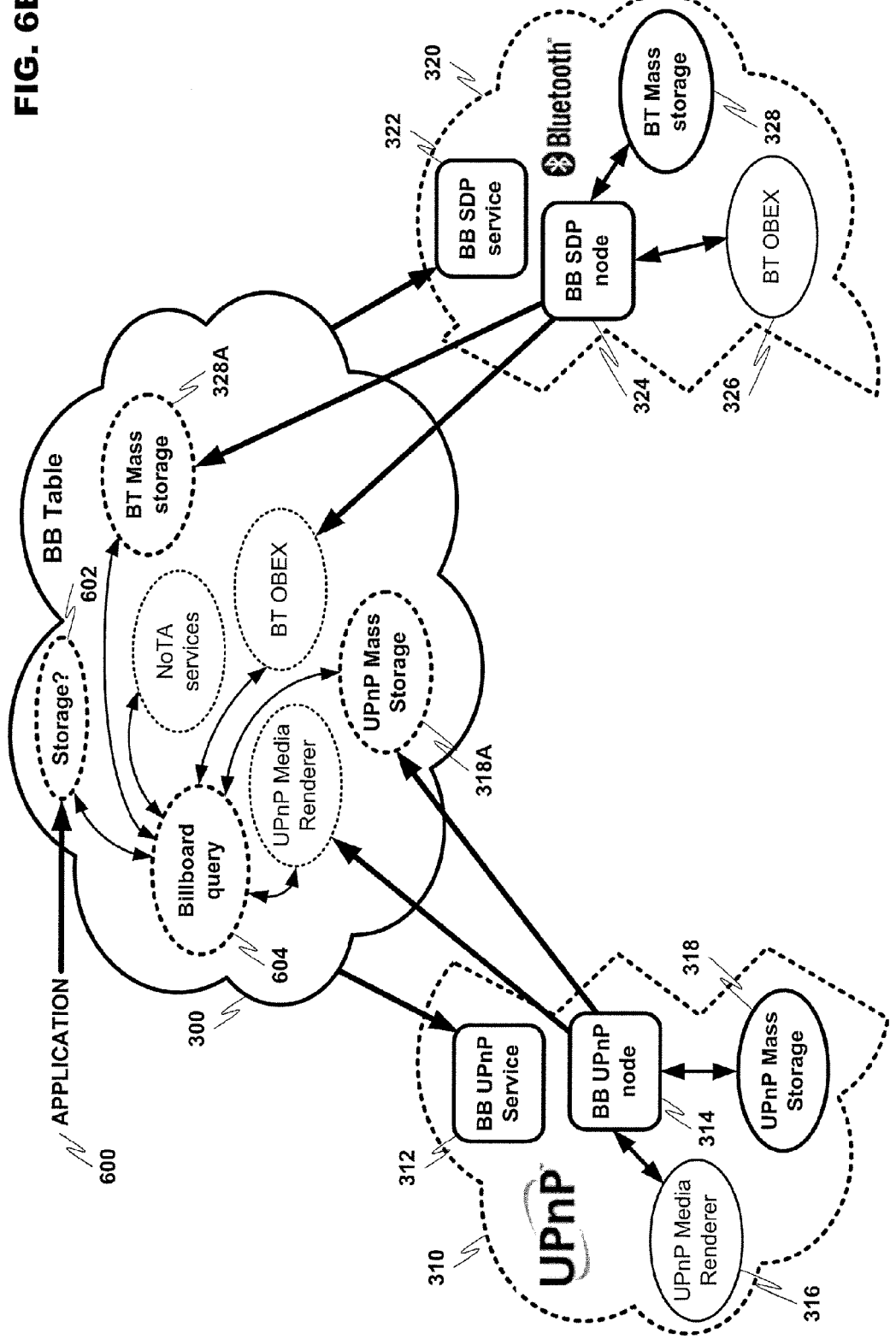

An inquiry process in accordance with at least one embodiment of the present invention is shown in FIG. 6B. Storage inquiry 602 may be referred billboard query 604, which queries all of the service nodes in billboard table 300 in order to determine the services that may potentially fulfill the needs of Application 600. In FIG. 6B two service nodes have been highlighted as potentially corresponding to services appropriate for storage requirement 602. The potentially applicable service nodes are UPnP mass storage 318A and BT mass storage 328A. Billboard query 604 may further obtain information related to the services from their respective nodes. For example, property information may be supplied by service nodes 318A and 328A to application 600 through billboard query 604. Information regarding transport mediums usable by each service may also be obtained through the use of connectivity map 480. All of the aforementioned information may be used in deter mining which service to select for supporting application 600. For example, the properties of a particular service may be more useful for, or accessible to, application 600. A particular service may also be selected because a usable transport medium is better able to support the activity to be performed because other transport mediums already have too much traffic, are experiencing interference, conflict with other transport mediums, etc.

Figure 6C:
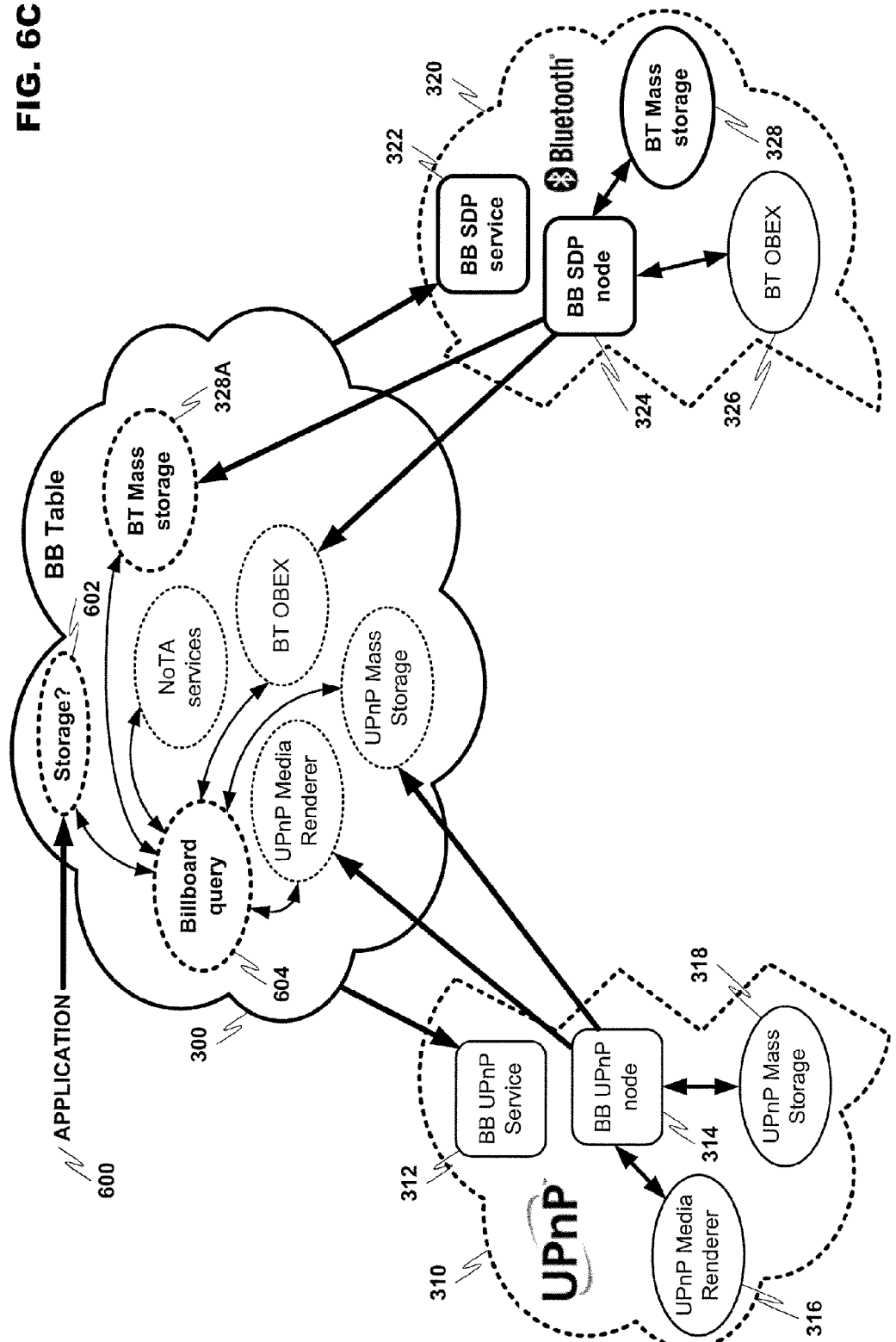
Figure 6D:
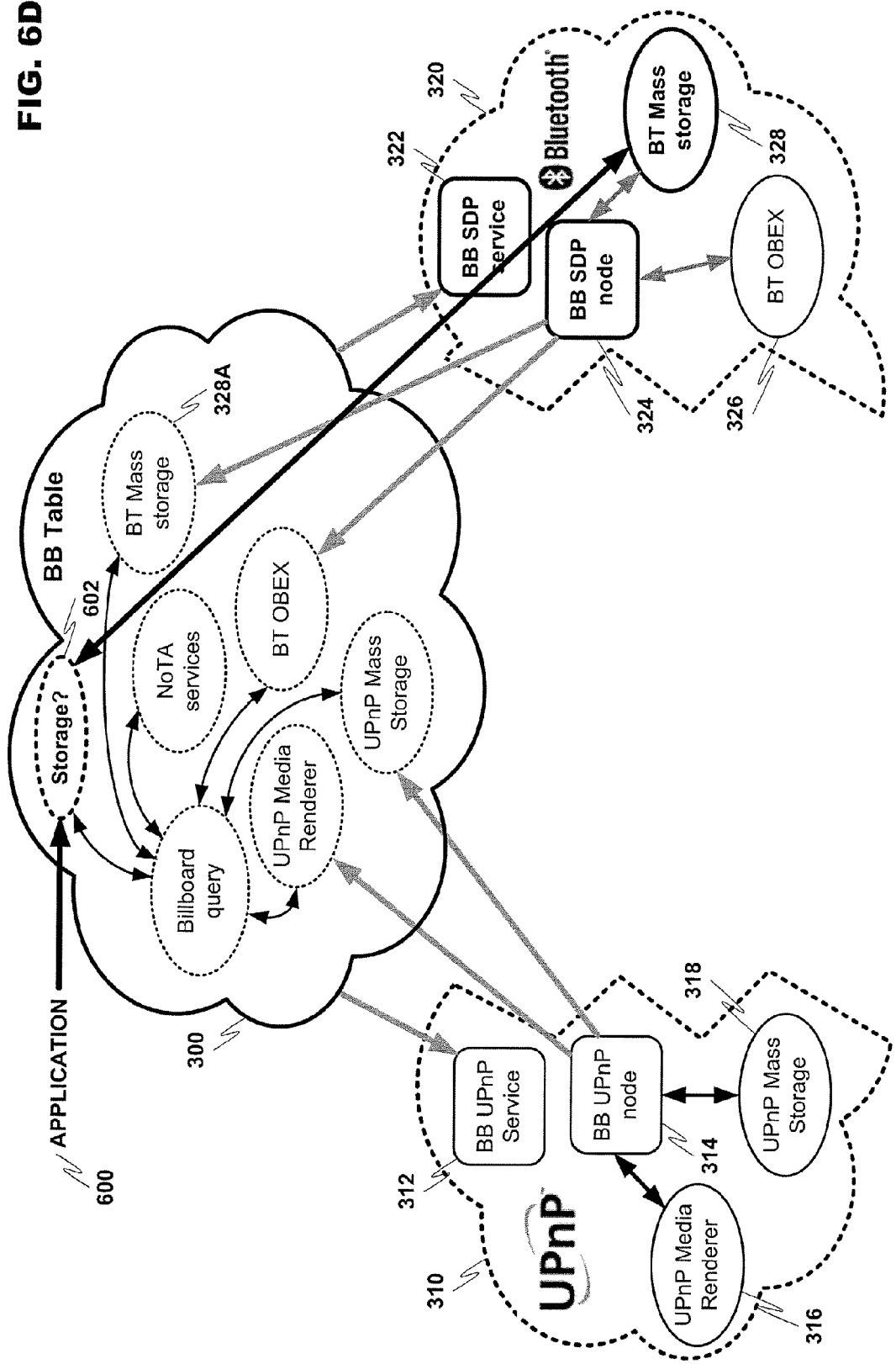
Figure 6E:
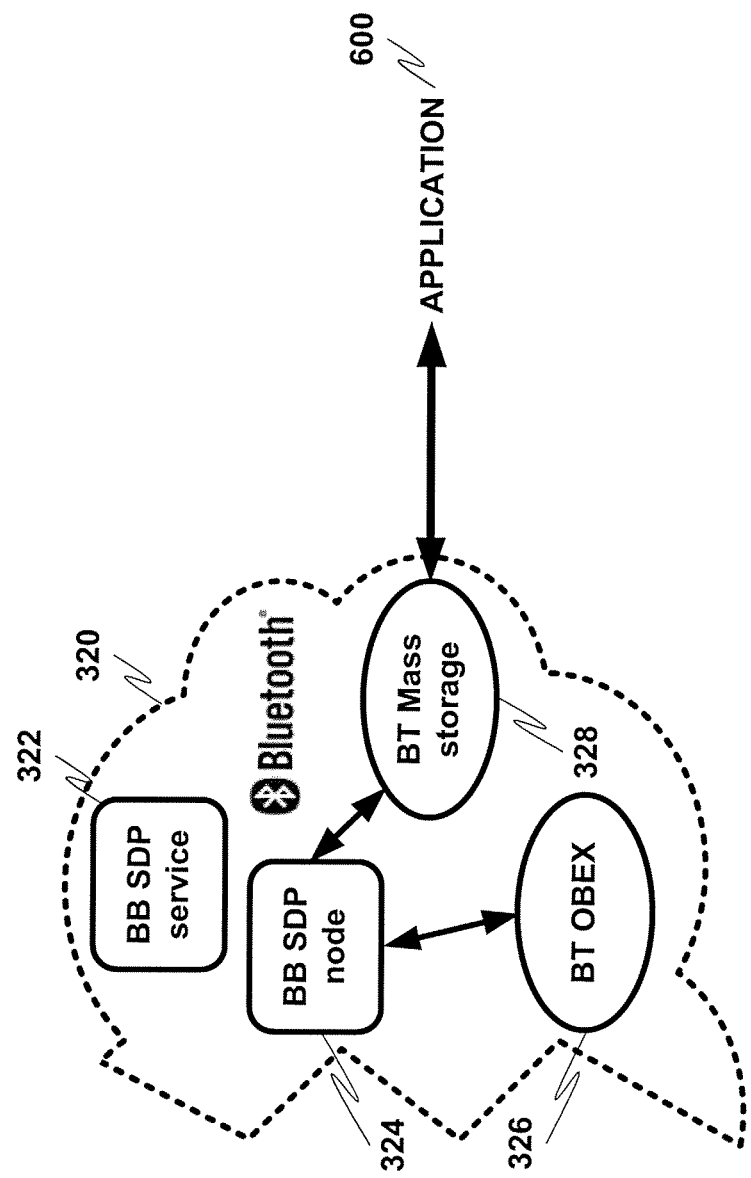

In FIG. 6C, BT mass storage service node 328A has been selected to support application 600. This selection may be made automatically by control elements in the one or more devices supporting billboard table 300, by application 600, by user selection of a preferred service and/or transport medium, etc. Billboard query 604 may then obtain all of the information necessary to access BT Mass storage service 328 from BT mass storage service node 328A. This information may include, for example, property information and transport medium information that may be further conveyed to application 600 in order to facilitate a direct link between application 600 with BT Mass storage service 328. An exemplary direct linkage is shown in FIG. 6D, and a communication transaction resulting between application 600 and BT Mass storage service 328 is further shown in FIG. 6E.

Figure 6F:
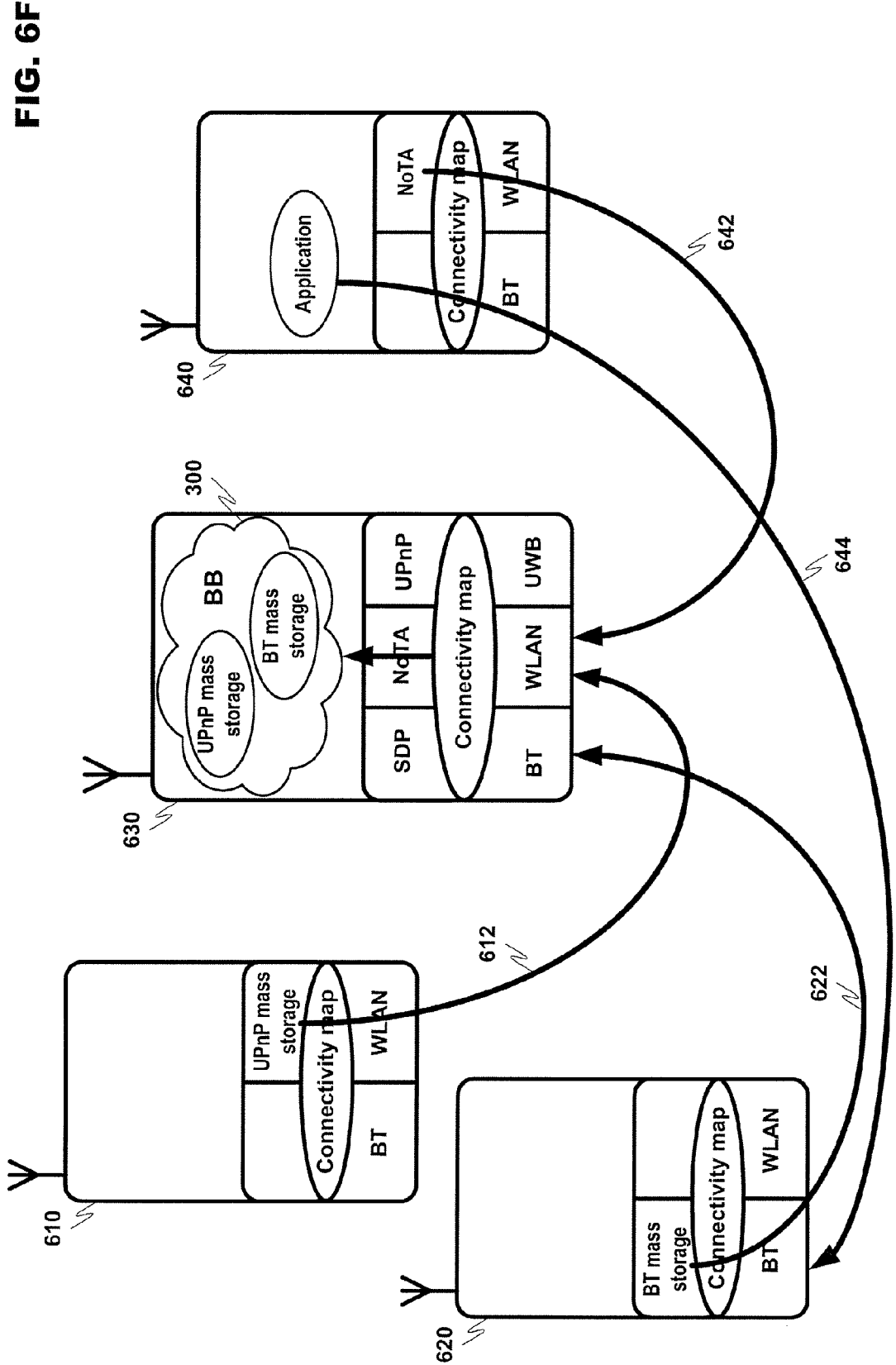
FIG. 6F discloses an example of the provision of services between devices using a billboard in accordance with at least one embodiment of the present invention.

Now referring to FIG. 6F, an example of devices providing services to other devices via billboard table 300 in accordance with at least one embodiment of the present invention is disclosed. In this example, devices 610 and 620 may be wirelessly coupled to device 630. A UPnP protocol in device 610 may couple to device 630 via WLAN, as shown at 612, in order to create a UPnP mass storage service node in billboard table 300. Similarly, a BT mass storage service in device 620 may utilize the BT SDP protocol to create a service node in billboard table 300 via Bluetooth™ communication 622. After these devices have established billboard table 300, device 640 may enter.

Device 640 includes an application that requires a storage service. Device 640 may then access billboard table 300 on device 630 as shown at 642. This connection may be made, for example, utilizing a NoTA service communicating over WLAN. Device 640 may access billboard table 300 in order to query the available services. If more than one applicable service is located, a selection may be made as to the service most appropriate for the application. In this example it is determined that the BT mass storage service will be most appropriate to assist the application in device 640. Device 640 may then obtain information from the BT mass storage node, such as property and transport medium information, that will be needed in order to access the BT mass storage service. Device 640 may then access the BT mass storage service on device 620 in order to establish a direct connection between the application and the service a shown at 644.

V. Exemplary Process Flow

Figure 7:
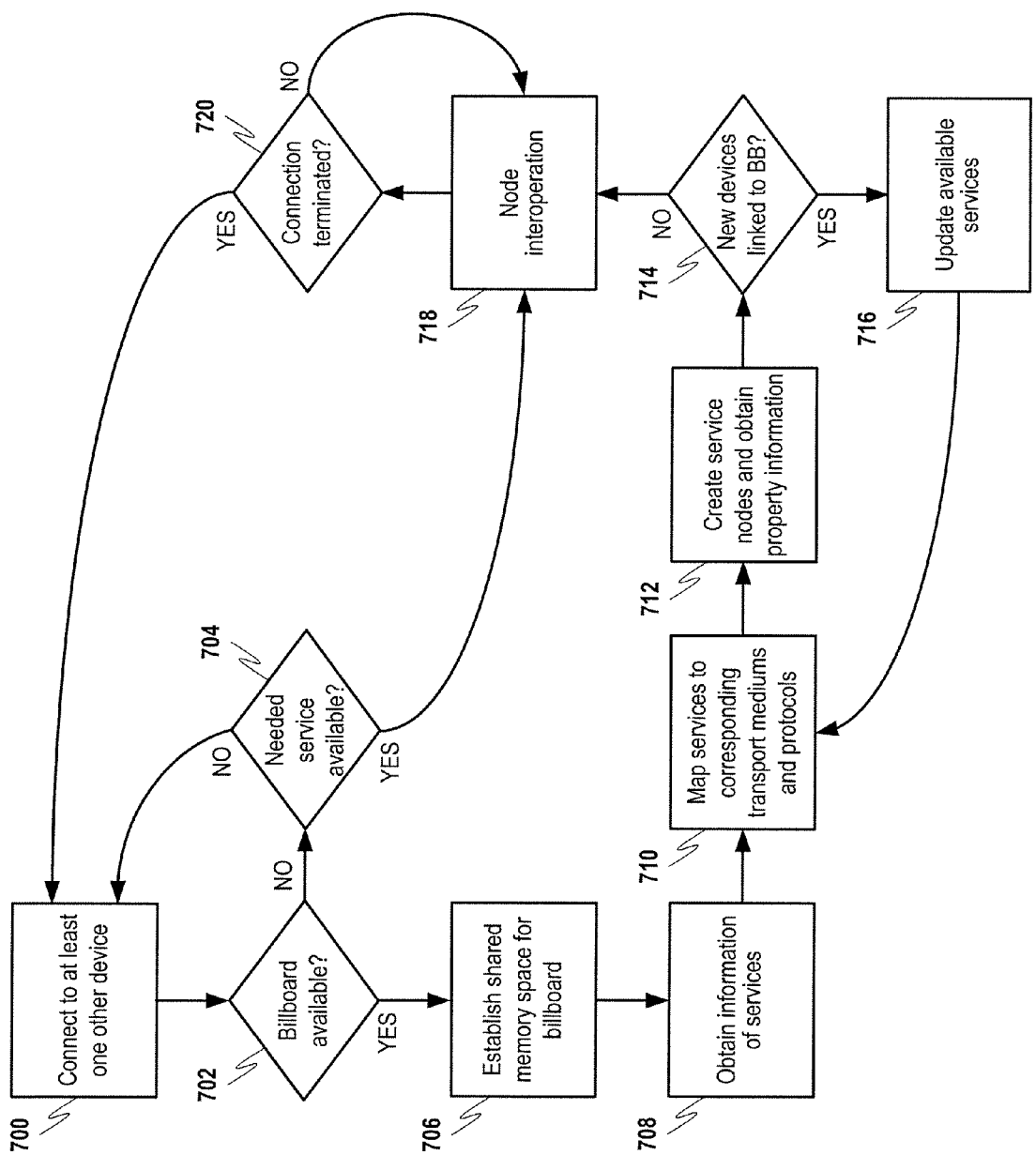
FIG. 7 discloses an exemplary flowchart for a process for service node creation in accordance with at least one embodiment of the present invention.

A process for establishing service nodes in accordance with at least one embodiment of the present invention is disclosed in FIG. 7. In step 700, a device may wirelessly link to another device. For example, an initial connection may be established over a wireless communication medium supported by at least two devices. After the initial connection is established, a determination may be made in step 702 as to whether billboard 300 is available on the linked devices. If billboard 704 is not available, then in step 704 the availability of resources related to supporting a needed service is verified. If these services are available, the process may proceed to node interoperation 718 where various nodes may interact. Otherwise, the process may return to step 700 until at least two Billboard-enabled devices are linked. Alternatively, if billboard 300 is available the process may move to step 706.

In step 706 a shared memory space may be established amongst the at least two participating devices in order to support billboard table 300. A query may then occur in step 708 in order to obtain information on all services offered by the devices involved in billboard table 300. An inquiry may be made, for example, by billboard query 604. As part of this inquiry, the names, property information, transport medium information, etc. for each offered service may be collected. This service information may be used, for example, to create a connectivity map 480 linking services to all corresponding usable transport mediums and protocols in step 710. Further, one or more service nodes associated with a service may be created in step 712. A service node may be created in shared memory space for each service offered by the at least two linked devices.

In step 714, a determination may be made as to whether any additional devices have been wirelessly linked to the existing at least two devices for participation in billboard 300. If new devices have been added, then in step 716 services available on the newly added device(s) may be incorporated into billboard 300 by repeating steps 710 and 712 in order to create additional transport mapping and service node creation to account for the additional or changed services. If in step 714 no further devices have been added to billboard 300, then node interoperation may begin in step 718. Node interoperation may include exemplary interaction between service nodes, at least one aspect of which is described in more detail with respect to the flowchart of FIG. 8. Node interoperation may continue in step 720 until the connection is terminated. The process may then return to initial step 700 to wait for a new wireless connection to occur between devices.

Figure 8:
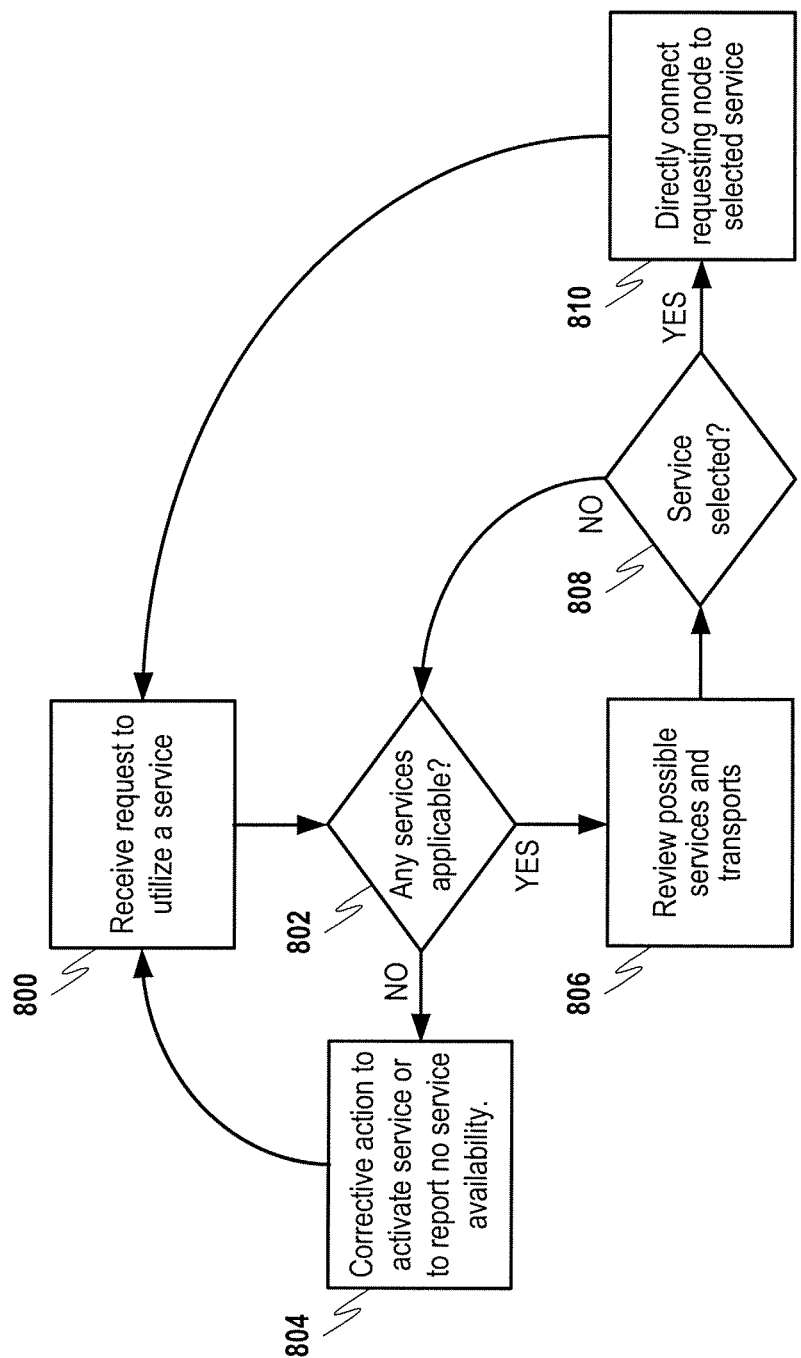
FIG. 8 discloses an exemplary flowchart for a process for accessing a service node in accordance with at least one embodiment of the present invention.

A process describing an exemplary interaction between an application and billboard 300 in accordance with at least one embodiment of the present invention is now described with respect to FIG. 8. In step 800 an application may request utilization of a service. This request may be routed, for example, via billboard query 604. Billboard query 604 may then interact with one or more services, for example services that are linking components of a NoTA, in order to determine if any of the services offered by the at least two devices, and represented by service nodes in billboard 300, may be applicable to meeting the needs of the requesting application. If in step 802 no suitable service nodes are located, then in step 804 corrective action may occur. Corrective action may include activating the required service on the at least two devices, or may involve notification to a requesting application and/or a user that the service required by the application is currently not available. The process may then return to step 800 to await a new or modified service inquiry. If at least one service node is located that may be applicable to fulfilling the requirements of the requesting application, then the process may proceed to step 806.

In step 806 the services applicable to the requirements of the requesting application node may be reviewed. This review may include reviewing the properties of each service, which may be available to the requesting application from the service node, and further, reviewing the corresponding transport mediums usable by each service. The transport mediums may be determined, for example, by reviewing a connectivity map 480 that links services and corresponding transport mediums.

A service may be selected based on a variety of characteristics related to one or more of the requesting application, the particular service, the device a service resides upon, the transport medium usable by a service, etc. If no service is selected in step 808, then the process may return to step 802 until an acceptable service is located or no potential services are located (e.g., step 804). Once a service is selected, then in step 810 the application may be directly connected to the service, allowing the application to directly access the service, and the process may then return to step 800 to await the next application that may request access to a service.

Accordingly, it will be apparent to persons skilled in the relevant art that various changes in form a and detail can be made therein without departing from the spirit and scope of the invention. The breadth and scope of the present invention should not be limited by any of the above-described exemplary embodiments, but should be defined only in accordance with the following claims and their equivalents.

What is claimed is:

1. A method, comprising:
    linking at least two devices via at least one wireless communication medium to form a network;
    creating a shared memory space for maintaining information accessible by any of the at least two devices forming the network;
    obtaining service information related to services offered by any of the at least two devices within the network, the service information including transport medium information;
    creating a connectivity table, wherein the connectivity table is associated with the service information and maps the transport medium information to the service information;
    creating service nodes corresponding to the service information in the shared memory space; and
    mapping the shared memory space in order to select at least one service node specified by an application resident on a device in the network and at least one transport medium determined utilizing the connectivity table.

2. The method of claim 1, wherein the at least one service node provides service property information and transport medium information to the application.

3. The method of claim 1, wherein the application is directly coupled to the service after the at least one service node and at least one transport medium are selected.

4. A computer program product comprising computer executable program code recorded on a computer readable non-transitory storage medium, the computer executable program code comprising:
    code configured to cause at least two devices to link via at least one wireless communication medium to form a network;
    code configured to cause a device to create a shared memory space for maintaining information accessible by any of the at least two devices forming the network;
    code configured to cause a device to obtain service information related to services offered by any of the at least two devices within the network, the service information including transport medium information;
    code configured to cause a device to create a connectivity table, wherein the connectivity table is associated with the service information and maps the transport medium information to the service information;
    code configured to cause a device to create service nodes corresponding to the service information in the shared memory space, and
    code for mapping the shared memory space in order to select at least one service node specified by an application resident on a device in the network and at least one transport medium determined utilizing the connectivity table.

5. The computer program product of claim 4, wherein the at least one service node provides service property information and transport medium information to the application.

6. The computer program product of claim 4, wherein the application is directly coupled to the service after the at least one service node and at least one transport medium are selected.

7. A device, comprising:
    at least one processor; and
    at least one memory including computer program code, the at least one memory and the computer program code configured to, with the at least one processor, cause the apparatus at least to:
    connect the device to a network via a communication medium;
    create a shared memory space for maintaining information accessible by any device in the network;
    obtain service information related to services offered by any of the devices within the network, the service information including transport medium information, including communication mediums over which each offered service is accessible;
    create a connectivity table, wherein the connectivity table is associated with the service information, wherein the connectivity table maps each of the offered services to the communication mediums over which each service is accessible;
    create service nodes corresponding to the service information in the shared memory space; and
    map the shared memory space in order to select at least one service node specified by an application resident on the device in the network and at least one transport medium determined utilizing the connectivity table.

8. A method, comprising:
    querying a shared memory space established amongst two or more devices connected in a network, the shared memory space including service nodes related to services offered by any of the two or more devices within the network, the service nodes being configured to provide information including property information;
    querying a connectivity table, wherein the connectivity table is associated with the services, wherein the connectivity table maps each of the offered services to the communication mediums over which each service is accessible; and
    selecting at least one service node in the shared memory space;
    wherein the shared memory space is mapped to enable selecting at least one service node specified by an application resident on a device in the network and at least one transport medium determined utilizing the connectivity table.

9. A computer program product comprising computer executable program code recorded on a computer readable non-transitory storage medium, the computer executable program code comprising:
    code configured to cause a device to query a shared memory space established amongst two or more devices connected in a network, the shared memory space including service nodes related to services offered by any of the two or more devices within the network, the service nodes being configured to provide information including property information;

code configured to cause a device to query a connectivity table, wherein the connectivity table is associated with the services, wherein the connectivity table maps each of the offered services to the communication mediums over which each service is accessible; and code configured to cause a device to select at least one service node in the shared memory space;

wherein the shared memory space is mapped to enable selecting at least one service node specified by an application resident on a device in the network and at least one transport medium determined utilizing the connectivity table.

10. A device, comprising:

at least one processor; and at least one memory including computer program code, the at least one memory and the computer program code configured to, with the at least one processor, cause the apparatus at least to:

query a shared memory space established amongst two or more devices connected in a network, the shared memory space including service nodes related to services offered by any of the two or more devices within the network, the service nodes being configured to provide information including property information;

query a connectivity table, wherein the connectivity table is associated with the services, wherein the connectivity table maps each of the offered services to the communication mediums over which each service is accessible; and select at least one service node in the shared memory space;

wherein the shared memory space is mapped to enable selecting at least one service node specified by an application resident on a device in the network and at least one transport medium determined utilizing the connectivity table.

* * * * *